Sept. 2, 1952 R. B. GRAY 2,608,873
ADJUSTMENT DEVICE
Filed Aug. 5, 1949

Inventor
Robert B Gray
By
Ralph Hammar
Attorney

Patented Sept. 2, 1952

2,608,873

UNITED STATES PATENT OFFICE 2,608,873

ADJUSTMENT DEVICE

Robert B. Gray, Erie, Pa., assignor to American Meter Company, Erie, Pa., a corporation of Delaware Application August 5, 1949, Serial No. 108,777

2 Claims. (Cl. 74—209)

There is a need for adjustment devices which are readily movable and which remain in adjusted position. This invention is intended to provide such a device.

Figure 1:
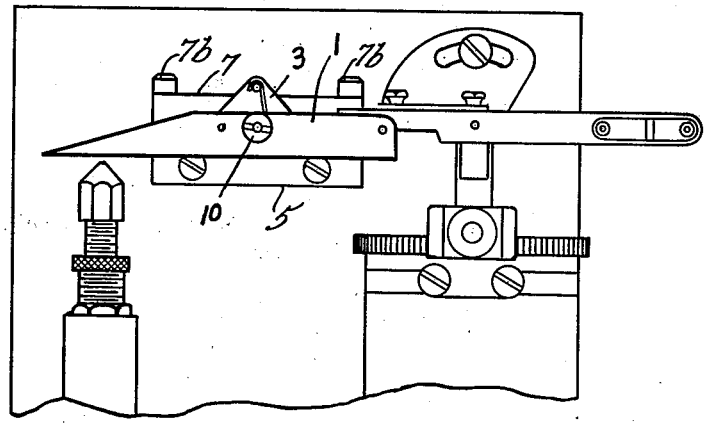
Figure 2:
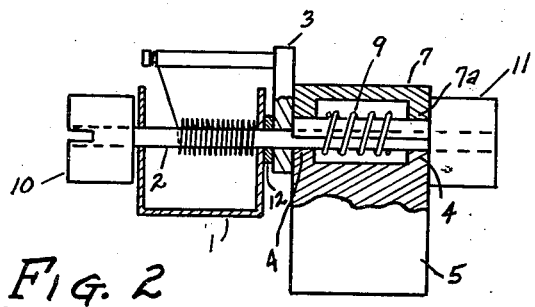
Figures 3, 4:
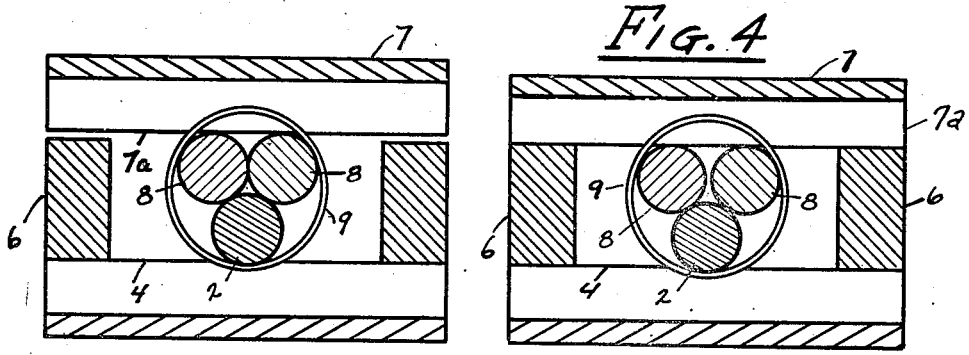

In the drawing, Fig. 1 shows an adjustment device for moving the pivot point of a lever; Fig. 2 is a transverse section; Fig. 3 is an enlarged view showing the device in an inoperative position; and Fig. 4 is a similar view in operative position.

The adjustment device is shown applied to an instrument having a lever 1 pivoted on a roller 2 journaled in a slide 3. The roller 2 rides on spaced tracks 4 on a block 5. At each end of the block are spacers 6 which hold spaced tracks 7a on top bar 7 a fixed distance from the tracks 4, when the top bar is clamped to the block 5 by tightening screws 7b. On each side of the roller 2 is a roller 8. The rollers are urged into contact by a coil spring 9. If the top bar 7 were raised to the position shown in Fig. 3, the rollers 8 would come into contact with each other and under this condition turning of the roller 2 would not produce any movement along the tracks 4. This is due to the fact that the rollers 8 due to their frictional contact with each other tend to turn in opposite directions and thereby hold the roller 2 in a fixed position. When the top bar 7 is solidly fastened to the block 5 it is lowered to the position shown in Fig. 4 and the rollers 8 are spread apart so the rollers no longer contact each other. In this position, rotation of the roller 2 causes it to roll on the tracks 4 and at the same time to drive both rollers 8 in the same direction. While the roller 2 may be readily turned, there is a substantial frictional resistance to sliding which effectively holds the roller 2 in any adjusted position. From one aspect, the rollers in the Fig. 4 position form a positive connection between the tracks 4 and the top bar 7 which permits relative movement only by turning of the rollers.

The roller 2 has a head 10 which may be slotted to receive a screw driver and collars 11 and 12 which respectively ride against one side of the block 5 and top bar 7 and against the slide 3. The function of the collars is to hold the rollers perpendicular to the tracks 4. The tracks 4 engaged by the roller 2 determine the nature of the movement. If these tracks are accurate, the linear movement will accurately correspond to the rotation of the roller. The tracks 7a are not critical and need only be smooth enough to prevent locking or jamming of the rollers.

The adjustment device has no lost motion since there is no clearance between the rollers and tracks.

What I claim as new is:

1. An adjustment device comprising opposed tracks, a roller engaging one of the tracks, a pair of rollers engaging the other track and the first roller on the side of the first roller presented toward the other track, and tension spring means encircling the rollers and urging the rollers together, the diameter of the rollers being such that the pair of rollers are out of contact with each other.

2. In combination opposed surfaces movable toward and away from each other, a pair of rollers engaging one of the surfaces and each other, a single roller between the pairs of rollers and engaging the other surface, tension spring means encircling the rollers and urging the rollers together, said pair of rollers being forced apart out of contact with each other as the surfaces are brought closer together whereby the rollers comprising said pair are free to roll in the same direction.

ROBERT B. GRAY.

REFERENCES CITED

The following references are of record in the file of this patent:

UNITED STATES PATENTS

| Number | Name | Date |
|---|---|---|
| 1,222,915 | Anderson | Apr. 17, 1917 |
| 1,737,695 | Zadow | Dec. 3, 1929 |
| 2,329,635 | McGall | Sept. 14, 1943 |